United States Patent Office 3,447,750
Patented June 3, 1969

3,447,750
SPRAYING BOOMS
Harry William Weston, Witcombe Place, Albion St.,
Cheltenham, England
Filed Dec. 28, 1965, Ser. No. 516,872
Claims priority, application Great Britain, Dec. 28, 1964,
52,539/64
Int. Cl. B05b 1/20; E01h 3/02
U.S. Cl. 239—167                      11 Claims

ABSTRACT OF THE DISCLOSURE

A spraying boom for mounting on an agricultrual tractor or other self-propelled vehicle has side sections which when mounted extend on opposite sides of the vehicle. A central pivotal mounting is provided which supports the weight of the boom in use and is formed for attachment to the vehicle. The mounting defines a pivot axis about which the boom can swing as a whole in a general vertical plane. Ground-engaging members are provided which respectively project downwardly from the side sections and which clear level ground when the boom is at the normal spraying height, damping means also being provided to control and damp swing of the boom as a result of one of the ground-engaging members striking the ground.

---

This invention relates to spraying booms for the spraying of crops or the like, and is particularly concerned with spraying booms for mounting on agricultural tractors.

Spraying booms at present used with agricultural tractors and other self-propelled vehicles are normally mounted at a fixed height, and with a boom of reasonable length difficulties occur on ground which is not level in a direction lateral to the direction of travel of the vehicle. Apart from the obvious problem of avoiding one end of the boom striking the ground it is desirable to ensure that the general height of the boom above the ground is maintained within reasonable limits to ensure satisfactory and economical spraying.

According to the invention a spraying boom for mounting on an agricultural tractor or other self-propelled vehicle has a central pivotal mounting about which it can swing a general vertical plane and on either side of which it is provided with ground-engaging members which clear the ground when the boom is at the normal spraying height, damping means being provided to control and damp the swing of the boom as a result of one of the ground-engaging members striking the ground.

The boom may also be arranged to pivot in a generally horizontal plane so that it will deflect on striking an obstacle, conveniently against resilient means urging the boom to a normal position disposed laterally of the vehicle.

The ground-engaging members are conveniently of adjustable height and are preferably disposed towards the end of the boom, conveniently about three-quarters of the way out from the central pivot axis. Preferably the damping means take the form of two single- or double-acting hydraulic shock absorbers respectively mounted on opposite sides of the pivot axis and each controlling swing of the boom in one direction.

The boom is conveniently formed for mounting on the front loader arms of a tractor and may comprise three sections, namely a central section associated with the pivotal mounting and two side sections pivotally attached to the central section so that they can be swung back to clear an obstacle or stowed alongside the tractor when not in use. The two side sections may each be in the form of a spray tube which is apertured to provide spray jets through which liquid is sprayed. Alternatively, two tubes may be used, one to provide structural strength and the other to provide a separate spray tube. In either case, the spray tube of each side section may be of reduced diameter at the outer end to give a more lightweight construction.

Figure 1:
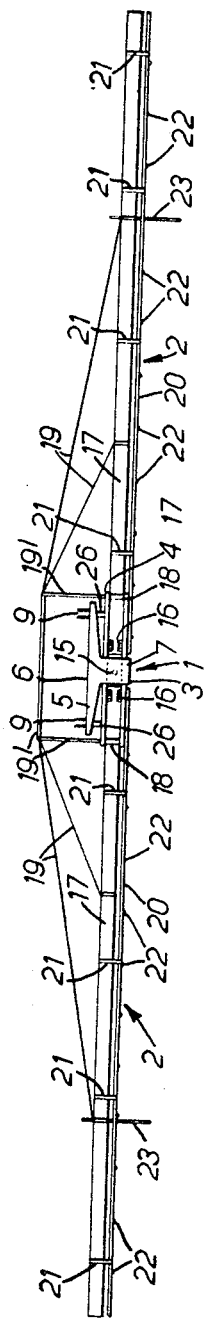
Figure 2:
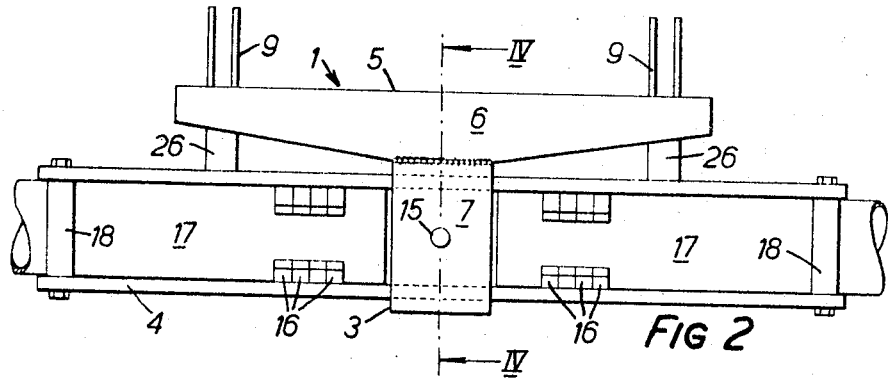
Figure 3:
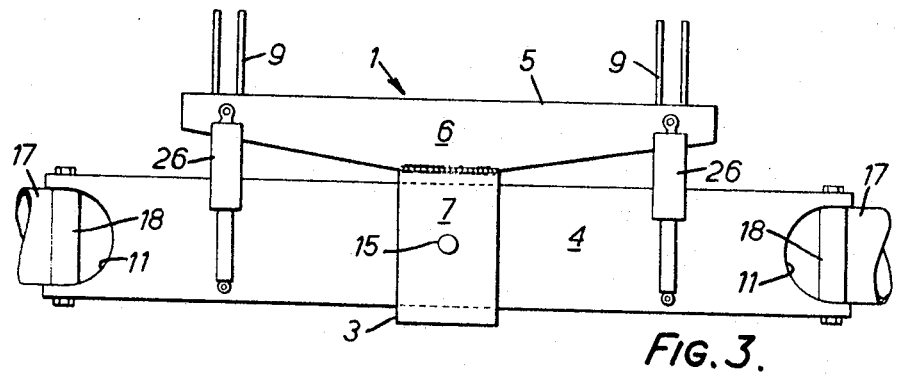
Figure 4:
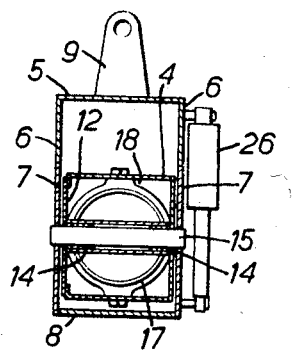
Figure 5:
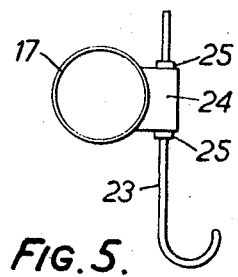

A spraying boom representing an illustrative embodiment of the invention will now be described by way of example with reference to the accompanying drawings, in which:

FIGURE 1 is a front view of the boom,
FIGURE 2 is a front view, to a larger scale, of the centre section of the boom with certain parts removed,
FIGURE 3 is a view from the rear of FIGURE 2,
FIGURE 4 is a section on the line IV—IV of FIGURE 2,
FIGURE 5 shows a detail, to a larger scale, of FIGURE 1, and
FIGURE 6 shows the boom mounted on a tractor.

The boom comprises a centre section 1 and two side sections 2 pivoted to the centre section, the latter being made up of two parts. The two parts of the centre section 1 are a frame 3 and a support 4 mounted within the latter. The frame 3 is formed from a short length of a cast channel member 5 the limbs 6 of which are tapered towards the outer ends. The channel member 5 is inverted and welded to each limb 6 is a central plate 7, the outer ends of the plates 7 being bridged by a base plate 8. The plates 7 and 8 form a central box portion in the frame 3 which carries the support 4. Two spaced and upwardly projecting brackets 9 are provided on the base of the channel member 5 for attachment to the loader arms 10 of the tractor (FIGURE 6).

The support 4 is pressed from heavy gauge metal and is in the form of a channel lying on its side. Each end of the base of the support 4 is cut away at 11 for a purpose to be described and the limbs are bridged at a central region by a plate 12 (FIGURE 4) formed with a central aperture aligned with a corresponding aperture in the base. A tube 13 is received in said two aligned apertures, the tube having an internal bronze bush 14 at each end for a pivot pin 15 which passes through aligned apertures in the plates 7 and is held captive therein. On each side of the pivot point, about which the boom can pivot in a vertical plane, four spring clips 16 are provided on the base of the support 4.

Each side section 2 of the boom comprises a length of thin-walled aluminum tube 17 of 5 inch diameter which provides the structural strength of the boom. The tube 17 is pivoted to the centre section 1 at a point adjacent, but spaced from, its inner end by a trunnion 18 pivoted between the limbs of the support 4. The side sections 2 are retained in the operative position by the respective spring clips 16. As the tubes 17 are thin-walled and as the spring clips 16 have to be relatively strong, the tube tends to be deformed by the clips. In order to avoid such deformation, blocks of wood (not shown) may be driven into the ends of the tubes 17.

The tubes 17 of the side sections 2 are supported by wire guy ropes 19 extending from tubular metal masts $19^1$ provided on the support 4 of the centre section 1. As already mentioned, the tubes 17 provide the structural strength of the boom and separate spray tubes 20 are provided which are connected to the respective tubes 17 by spaced brackets 21. Each spray tube 20 is apertured at spaced intervals for the reception of jets 22 through which liquid is sprayed. Some three-quarters of the way along the length of each tube 17 from the pivot point there is provided a downwardly projecting ground-engaging member 23 of tubular metal and formed with a lower and rearwardly extending curved end which forms a skid. Each ground-engaging member 23 is supported on the respective tube 17 by a bracket 24 and two collars 25 (FIG- URE 5) provide a means of height adjustment for the member which acts in the manner of a caster. Further, each member 23 is set shorter than the desired spraying height so that when the boom is disposed horizontally on level ground the members 23 have a reasonable ground clearance.

Two single-acting hydraulic shock absorbers 26 are symmetrically disposed one on each side of the pivot point and are each pivoted at their ends to the frame 3 and support 4, respectively. Thus, each side section 2 has its own shock absorber 26.

When required for use, the boom is mounted on the loader arms 10 of the tractor using the brackets 9 and is tied back to the tractor at an angle so that gravity tends to swing the side sections 2 forwardly to their normal spraying positions at which their pivotal movement is limited by the support 4. The spray tubes 20 are each connected to a liquid supply tank, not shown, and the boom adjusted for the desired spraying height by varying the height of the tractor loader arms 10 under the normal hydraulic control thereof. The ground-engaging members 23 are then adjusted to give the required ground clearance.

During operation on ground which undulates or is inclined laterally of the direction of travel of the tractor one of the ground-engaging members 23 will normally engage the ground before the latter is struck by the adjacent end of the boom, and as a result is swung upwardly in a vertical plane about the pivot pin 15. The swinging movement is controlled by the corresponding shock absorber 26. If either of the side sections 2 strikes an obstacle, the tubes 17 and 20 can pivot in a horizontal plane at the trunnions 18 thereby disengaging the spring clips 16 which normally hold the tubes in the operative position. This pivotal movement is not hindered by the support 4 as the cutaway portions 11 allow freedom of movement. The side sections 2 may be stowed alongside the tractor, as indicated on the right of FIGURE 6.

The use of a 5 inch diameter aluminum tube for the tubes 17 gives a lightweight construction consistent with adequate strength and the use of guy ropes 18 further reduces the weight of the construction. A further reduction can be achieved by making the outer ends of the tubes 17 of reduced diameter.

I claim:

1. In combination with a vehicle, a spraying boom having side sections that extend on opposite sides of the vehicle, a central pivotal mounting which supports the boom and is attached to the vehicle, said mounting defining a substantially horizontal pivotal axis about which the boom swings in a generally vertical plane as a whole so that when one side section of the spraying boom swings up the other side section swings down, ground-engaging members projecting downwardly from said side sections, said ground-engaging members being spaced above the ground when the side sections of the boom are equal distances above the ground, and damping means extending between the boom and the vehicle to damp the swing of the boom when one of the ground-engaging members strikes the ground.

2. Structure as claimed in claim 1, and tie members by which a portion of the weight of the side sections is supported from said central pivotal mounting.

3. Structure as claimed in claim 1, in which said ground-engaging members are disposed toward the outer ends of said side sections about three-quarters of the way out from said horizontal pivotal axis.

4. Structure as claimed in claim 1, and means pivotally mounting said side sections on said central pivotal mounting for horizontal swinging movement relative to said central pivotal mounting.

5. Structure as claimed in claim 1, and means mounting said ground-engaging members on said side sections for adjustive vertical movement relative to said side sections.

6. Structure as claimed in claim 1, and means mounting each said side section for horizontal swinging movement on and relative to said central pivotal mounting about an upright axis adjacent but spaced from the inner end of the side section, and spring clip means engageable with said inner end normally to retain said side sections in outwardly swung position.

7. Structure as claimed in claim 1, and means mounting said side sections for pivotal movement on and relative to said central pivotal mounting about upright axes slightly inclined to the vertical so that the side sections are urged by gravity to a forward laterally projecting position.

8. Structure as claimed in claim 1, the lower ends of said ground-engaging members being curved rearwardly with respect to the normal direction of movement of the vehicle on which the boom is mounted.

9. Structure as claimed in claim 8, said rearwardly curved lower ends of said ground-engaging members being disposed in trailing relationship with said side sections to act in the manner of casters.

10. Structure as claimed in claim 1, said damping means comprising two single-acting hydraulic shock absorbers mounted on opposite sides of said horizontal pivotal axis and each controlling the swing of the boom in one direction about said horizontal pivotal axis.

11. Structure as claimed in claim 1, each side section comprising two parallel interconnected tubes, one to convey the material to be sprayed and the other to strengthen the side sections structurally.

References Cited

UNITED STATES PATENTS

| 1,634,701 | 7/1927 | Williams | 239—167 |
| 2,645,523 | 7/1953 | Long | 239—167 |
| 2,793,909 | 5/1957 | Gerbracht | 239—167 X |

FOREIGN PATENTS

| 154,283 | 11/1953 | Australia. |
| 1,019,295 | 10/1952 | France. |
| 557,068 | 11/1943 | Great Britain. |
| 525,182 | 5/1956 | Canada. |

EVERETT W. KIRBY, *Primary Examiner.*

U.S. Cl. X.R.

239—159, 172